(12) United States Patent
Malpani et al.

(10) Patent No.: US 7,739,721 B2
(45) Date of Patent: Jun. 15, 2010

(54) PER-USER AND SYSTEM GRANULAR AUDIT POLICY IMPLEMENTATION

(75) Inventors: Raghavendra Malpani, Redmond, WA (US); Robert Eric Fitzgerald, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1252 days.

(21) Appl. No.: 11/271,014

(22) Filed: Nov. 10, 2005

(65) Prior Publication Data

US 2007/0011746 A1 Jan. 11, 2007

Related U.S. Application Data

(60) Provisional application No. 60/698,160, filed on Jul. 11, 2005.

(51) Int. Cl.
*G06F 17/00* (2006.01)
(52) U.S. Cl. .......................................................... 726/1
(58) Field of Classification Search ...................... 726/1
See application file for complete search history.

(56) References Cited

U.S. PATENT DOCUMENTS

| | | | | |
|---|---|---|---|---|
| 5,361,359 | A * | 11/1994 | Tajalli et al. ............... | 726/23 |
| 5,586,260 | A * | 12/1996 | Hu ............................. | 726/12 |
| 6,785,654 | B2 * | 8/2004 | Cyr et al. ................ | 704/270.1 |
| 6,868,406 | B1 * | 3/2005 | Ogg et al. ..................... | 705/60 |
| 7,155,612 | B2 * | 12/2006 | Licis .......................... | 713/182 |
| 2001/0025346 | A1 * | 9/2001 | Kayashima et al. ......... | 713/200 |
| 2003/0014557 | A1 | 1/2003 | Berger et al. ................ | 709/318 |
| 2003/0051172 | A1 * | 3/2003 | Lordemann et al. ......... | 713/201 |
| 2003/0220940 | A1 | 11/2003 | Futoransky et al. ...... | 707/104.1 |
| 2004/0237094 | A1 | 11/2004 | Vambenepe et al. ......... | 719/328 |
| 2005/0071650 | A1 * | 3/2005 | Jo et al. ....................... | 713/188 |
| 2005/0091213 | A1 * | 4/2005 | Schutz et al. ................. | 707/9 |
| 2006/0156379 | A1 * | 7/2006 | Vissapragada ................ | 726/1 |
| 2006/0190985 | A1 * | 8/2006 | Vasishth et al. ............... | 726/1 |
| 2008/0216173 | A1 * | 9/2008 | Hammond .................. | 726/22 |

\* cited by examiner

*Primary Examiner*—Kambiz Zand
*Assistant Examiner*—Teshome Hailu
(74) *Attorney, Agent, or Firm*—Woodcock Washburn LLP

(57) ABSTRACT

System performance may be optimized, and extraneous audit noise reduced, by providing the capability of exercising a fine degree of control over individual audit events. A user such as an auditor interested in an individual audit event can obtain desired results without also obtaining results of all other individual audit events in the category containing the individual audit event. Additionally, audits may be obtained on either a per-user basis or on a system-wide basis. In this way, the auditor may tailor auditing events without regard to the auditing events established for other users of the system. Thus, there is a capability of establishing auditing policies for the entire system, in which case all users of the system may obtain results of the system-wide auditing.

20 Claims, 9 Drawing Sheets

600

605 — Typedef struct _AUDIT_POLICY_INFORMATION
{
605 ——— GUID   AuditSubCategoryGuid;
610 ——— ULON   AuditingInformation;
615 ——— GUID   AuditCategoryGuid;
}AUDIT_POLICY_INFORMATION, *PAUDIT_POLICY_INFORMATION;

FIG. 8

700 typedef struct _POLICY_AUDIT_SID_ARRAY {

ULONG UsersCount;
ifdef MIDL_PASS
      [size_is(UsersCount)] PAUDIT_SID_RPC* UserSidArray;
else
   PSID* UserSidArray;
endif

} POLICY_AUDIT_SID_ARRAY, *PPOLICY_AUDIT_SID_ARRAY;

```
typedef struct _POLICY_AUDIT_CATEGORY_ARRAY { ifdef MIDL_PASS
      [size_is(AuditCategoryCount)]
#endif
  GUID* AuditCategoriesArray;
  ULONG AuditCategoryCount;

} POLICY_AUDIT_CATEGORY_ARRAY, *PPOLICY_AUDIT_CATEGORY_ARRAY
```

```
typedef struct _POLICY_AUDIT_SUBCATEGORY_ARRAY { ifdef MIDL_PASS
      [size_is(AuditSubCategoryCount)]
#endif
  GUID* AuditSubCategoriesArray;
  ULONG AuditSubCategoryCount;

} POLICY_AUDIT_SUBCATEGORY_ARRAY, *PPOLICY_AUDIT_SUBCATEGORY_ARRAY;
```

FIG. 11

PER-USER AND SYSTEM GRANULAR AUDIT POLICY IMPLEMENTATION

CROSS REFERENCE TO RELATED APPLICATION

This application claims benefit under 35 U.S.C. §119(e) of Provisional U.S. patent application No. 60/698,160, filed Jul. 11, 2005, entitled "Individual Audit Event Policy," the disclosure of which is incorporated herein by reference in its entirety.

BACKGROUND

Computer systems may implement security policies to protect their information and service resources from unauthorized accesses. Such systems may audit, for example, directory and file accesses or server events and record such events in security logs. The logs may be reviewed to help flag security breaches. Users of such systems may configure the security audits to track certain events and may decide to forego tracking other events.

Security policies may be divided into groups, and each group is hereinafter referred to as a "category." Each category of security policies includes individual audit events. For example, one category of security policies may be an object access audit category. The object access audit category may include individual security audits of accesses to, for example, the file system, the registry, and the kernel objects. In such a system, if a user wants the results of an individual audit event, then the computer system may be directed to perform an audit of an entire category, resulting in an audit of each security event in the category. For example, if a user would like to audit accesses to the file system, then the user instigates an audit of the object access category and obtains results of accesses to the file system as well as to the registry and the kernel.

Such a system prevents users from exercising a fine degree of control over security audits. That is, users may be unable to instigate a security audit of only the file system even though they may be uninterested in the results of the security audit of the registry or kernel accesses. This extraneous noise in the form of undesired security audits of the registry and kernel accesses unnecessarily consumes system resources and inhibits optimal system performance.

SUMMARY

System performance may be optimized, and extraneous audit noise reduced by providing a user such as a system auditor with the capability of exercising a fine degree of control over audit events. That is, an auditor may be provided the option of executing a security audit at a category level or at an individual audit event level. In such a system, for example, an auditor interested in an individual audit event such as file system accesses can obtain desired results without also obtaining results of all other individual audit events in the category containing the file system access audit.

Additionally, audits may be obtained on either a per-user basis or on a system-wide basis. That is, in computing environments with multiple users, an auditor may tailor auditing events to suit the particular level of monitoring necessary for a particular user without regard to the auditing events that are generated for the activities of other users on the system. In such a computing environment, there remains the capability of establishing auditing policies for the entire system, in which case all user activities are monitored in accordance with the system-wide audit policy.

The auditing policies may be established and implemented by a local security authority. An auditor may set or query audit policies, for example, by accessing a user-exposed application programming interface. This interface may display to the user all auditing functions, such as setting and querying, as well as display each category, subcategory, and individual audit event available. After the auditor selects a function and an individual audit event, subcategory or category, a remote procedure call may be executed, calling into the secure environment of the local security authority. Audit functions in the local security authority may be executed, and the results sent, for example, for display and review by the auditor.

BRIEF DESCRIPTION OF THE DRAWINGS

The foregoing summary and the following detailed description are better understood when read in conjunction with the appended drawings. Embodiments are shown in the drawings, however, it is understood that the claims are not limited to the specific methods and instrumentalities depicted therein. In the drawings:

FIG. 8 is an example of a structure that may be passed into and out of application programming interfaces and that may provide audit policy information associated with an audit subcategory or audit category.

FIG. 9 depicts an example data structure for providing audit policy established for a user, as identified by a security identifier.

FIGS. 10 and 11, respectively, depict example data structures for providing audit categories and audit subcategories available in the local security authority.

DETAILED DESCRIPTION OF ILLUSTRATIVE EMBODIMENTS

Example Computing Environment

Figure 1:
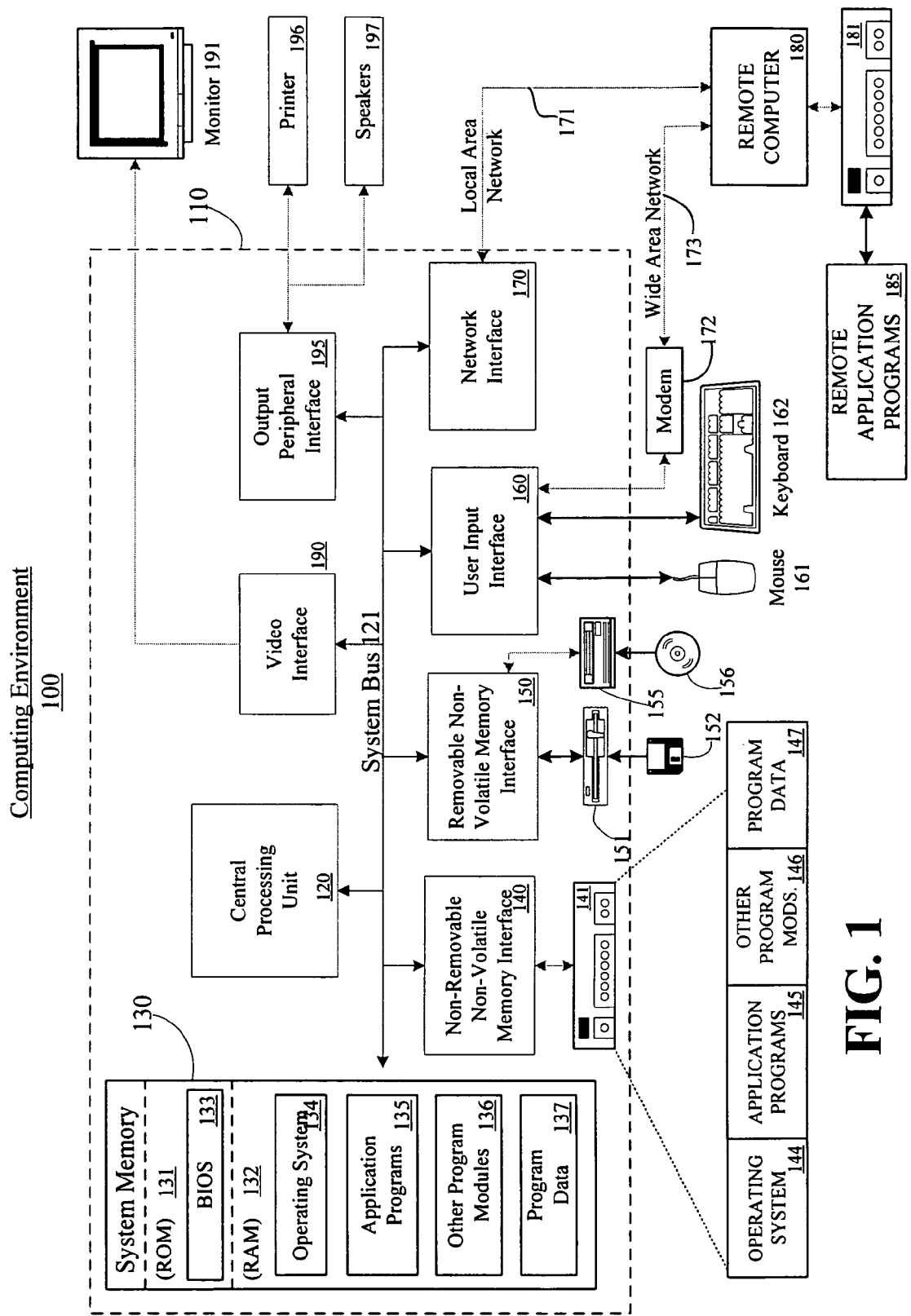
FIG. 1 is a block diagram showing an example computing environment in which aspects may be implemented.

FIG. 1 and the following discussion are intended to provide a brief general description of a suitable computing environment 100 in which an example embodiment may be implemented. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, hand-held computers, programmable consumer electronics, multimedia consoles, game consoles, satellite receivers, set-top boxes, automated teller machines, arcade games, mobile telephones, personal digital assistants (PDAs) and any other processor-based system or machine. The term "data" refers to any information of any form, including commands, transfers, notifications, or requests. The terms "program code" and "code" refer to any set of instructions that are executed or otherwise processed by a processor. A processor may include a runtime or virtual machine such as the Java virtual machine, for example.

While a general purpose computer is described below, this is merely one example. The present invention also may be operable on a thin client having network server interoperability and interaction. Thus, an example embodiment may be implemented in an environment of networked hosted services in which very little or minimal client resources are implicated, e.g., a networked environment in which the client device serves merely as a browser or interface to the World Wide Web.

Although not required, embodiments can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. An embodiment may also be practiced in distributed computing environments where tasks are performed by remote processing devices that are linked through a communications network or other data transmission medium. In a distributed computing environment, program modules may be located in both local and remote computer storage media including memory storage devices.

FIG. 1 illustrates an example of a suitable computing system environment 100 in which an embodiment may be implemented, although as made clear above, the computing system environment 100 is only one example of a suitable computing environment and is not intended to suggest any limitation as to the scope of use or functionality alternative embodiments. Nor should the computing environment 100 be interpreted as having any dependency or requirement relating to any one or combination of components illustrated in the exemplary operating environment 100.

With reference to FIG. 1, an example system for implementing an embodiment includes a general purpose computing device in the form of a computer 110. Components of computer 110 may include, but are not limited to, a central processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also included within the scope of computer readable media.

The system memory 130 includes computer storage media in the form of volatile and/or nonvolatile memory such as ROM 131 and RAM 132. A basic input/output system 133 (BIOS) containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A computer 110 or other client device can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

EXAMPLE EMBODIMENTS

Figure 2:
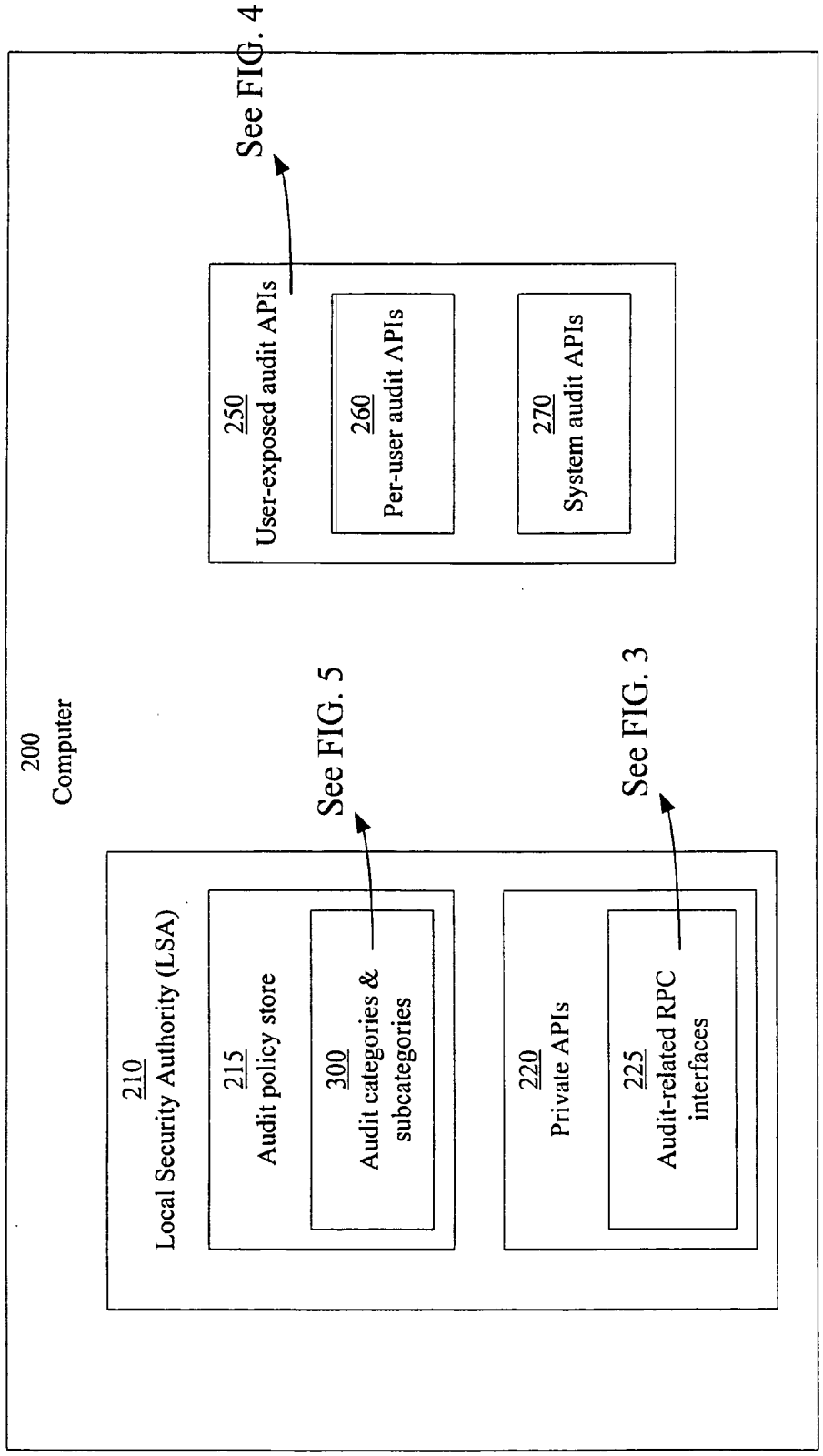
FIG. 2 is a block diagram of a computer for implementing a granular audit policy.

FIG. 2 is a block diagram of a computer 200 for implementing a granular audit policy. The computer 200 may be a computer 110 or a computing environment 100 described in FIG. 1. The computer 200 additionally may include a local security authority 210. The local security authority 210 may be any protected subsystem that performs security functions, such as authenticating and logging users onto the computer 200. The local security authority 210 additionally may maintain information about all aspects of local security on the computer 200. The local security authority 210 may include an audit policy store 215, that is, a database containing audit categories and subcategories 300. The local security authority 210 additionally may include application programming interfaces (APIs) 220. The APIs 220 may be "private" in that a user of the computer 200 and applications running on the computer 200 outside of the local security authority 210 may not have direct access to the private APIs 220. The private APIs 220 may include audit-related remote procedure call (RPC) interfaces 225. The RPC interfaces 225 may be APIs that expose an interface to, for example, an operating system of the computer 200. In this way, a change, query or other function of the local security authority's audit policy may be executed through the exposure of the audit-related RPC interfaces 225.

In addition to the local security authority 210, the computer 200 includes user-exposed audit APIs 250. The user-exposed audit APIs 250 include both per-user audit APIs 260 and system audit APIs 270. An auditor of the computer 200 may instigate the execution of functions such as setting or querying a per-user or system audit policy within the local security authority 210 through the user-exposed audit APIs 250. Additionally, while the user-exposed audit APIs 250 are shown in the computer 200 as an entity separate from the local security authority 210, the user-exposed audit APIs may alternatively be wrappers around APIs contained in the local security authority 210.

When an auditor calls, for example, a set system audit API from the system audit APIs 270, an entity on the computer 200 such as an operating system may send the call to the local security authority 210. One of the private APIs 220 and, more specifically, one of the audit-related RPC interfaces 225, may be accessed to implement the auditor's desired audit setting.

The local security authority 210 and the user-exposed audit APIs are described in more detail herein.

Figure 3:
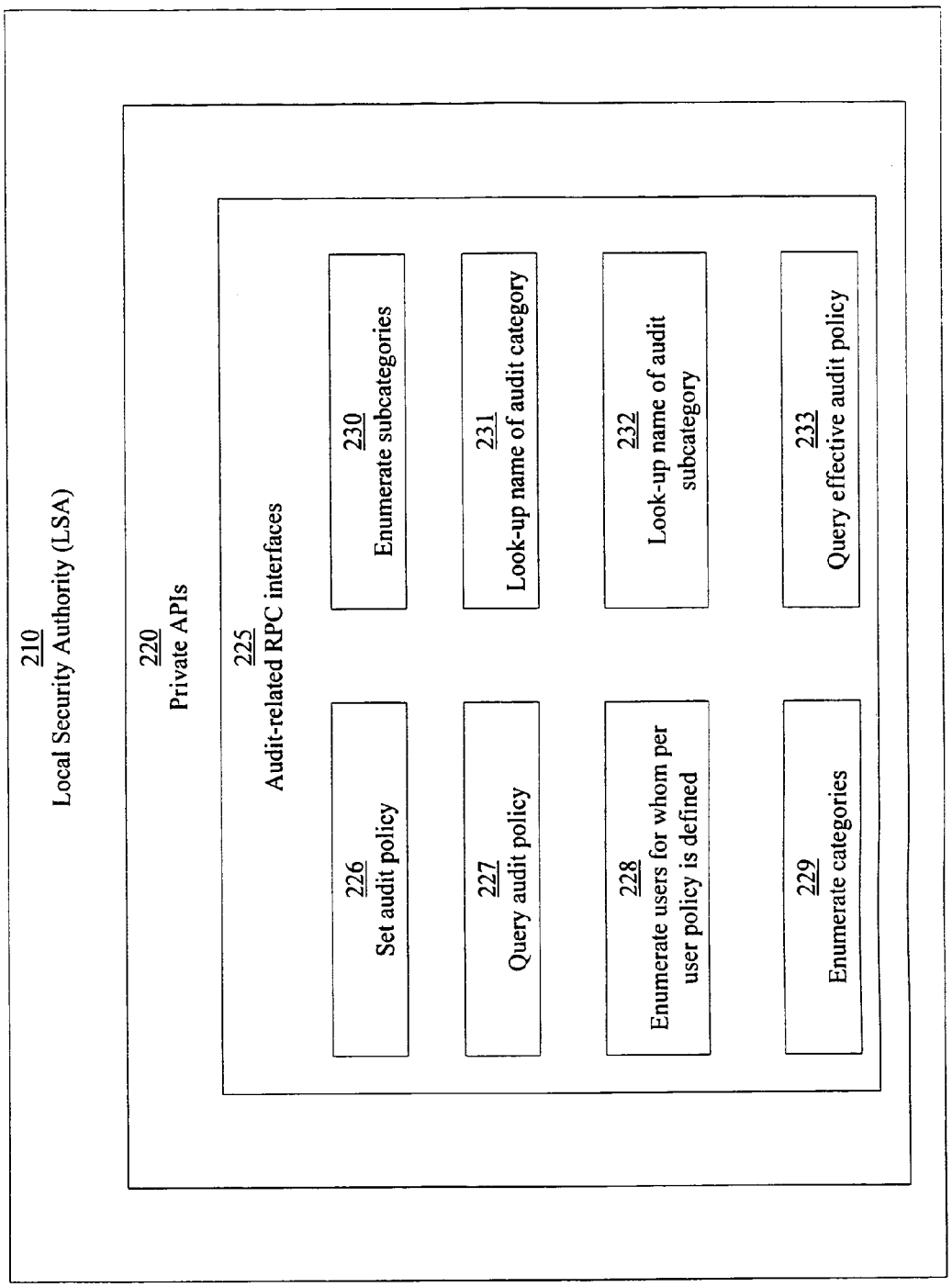
FIG. 3 is a block diagram of audit-related remote procedure calls that may be included within a local security authority.

FIG. 3 is a block diagram of a local security authority 210 and of the audit-related RPC interfaces 225 that may be included within the private APIs 220. The audit-related RPC interfaces 225 may include a set security audit policy RPC interface 226. The set security audit policy RPC interface 226 enables setting both system and per-user audit policy at the category, subcategory, or individual audit event level. The following is an example of a set security audit policy RPC interface 226:

```
NTSTATUS
LsarSetAuditPolicy(
    [in, unique, string] PLSAPR_SERVER_NAME
    ServerName,
    [in, unique] PLSAPR_SID PrincipalSid,
    [in, unique] GUID *ApplicationGuid,
    [in, range(0, LSA_MAXIMUM_AUDIT_POLICY_COUNT)]
    ULONG
        PolicyCount,
    [in, size_is(PolicyCount)]
    PCAUDIT_POLICY_INFORMATION
        AuditPolicy
    );
```

The audit-related RPC interfaces 225 may include a query audit policy RPC interface 227, which enables querying system or per-user audit policy at the category, subcategory, or individual audit event level. An example of a query audit policy RPC interface 227 follows:

```
NTSTATUS
LsarQueryAuditPolicy(
    [in,unique,string] PLSAPR_SERVER_NAME ServerName,
    [in,unique] PLSAPR_SID PrincipalSid,
    [in,unique] const GUID *ApplicationGuid,
    [in, range(0, LSA_MAXIMUM_AUDIT_POLICY_COUNT)]
    ULONG
        PolicyCount,
    [in, size_is(PolicyCount)] const GUID
    *SubCatogiesGuidArray,
    [out, size_is(, PolicyCount)]
    PAUDIT_POLICY_INFORMATION
        *AuditPolicy
);
```

The audit-related RPC interfaces 225 may include an RPC interface 228 to enumerate users for whom per-user policy is defined, an example of which follows:

```
NTSTATUS
LsarQueryAuditPolicy(
    [in,unique,string] PLSAPR_SERVER_NAME ServerName,
    [in,unique] PLSAPR_SID PrincipalSid,
    [in,unique] const GUID *ApplicationGuid,
    [in, range(0, LSA_MAXIMUM_AUDIT_POLICY_COUNT)]
    ULONG
        PolicyCount,
    [in, size_is(PolicyCount)] const GUID
    *SubCatogiesGuidArray,
    [out, size_is(, PolicyCount)]
    PAUDIT_POLICY_INFORMATION
        *AuditPolicy
);
```

The audit-related RPC interfaces 225 may include an enumerate categories RPC interface 229, which enables enumerating the list of categories understood by, for example, an operating system. An example of an enumerate categories RPC interface 229 follows:

```
NTSTATUS
    LsarEnumerateAuditCategories(
        [in,unique,string] PLSAPR_SERVER_NAME ServerName,
        [out] PPOLICY_AUDIT_CATEGORY_ARRAY
        *AuditCategoriesArray
    );
```

The audit-related RPC interfaces 225 may include an enumerate subcategories RPC interface 230, which enables enumerating a list of sub categories understood by, for example, an operating system:

```
NTSTATUS
    LsarEnumerateAuditSubCategories(
        [in,unique,string] PLSAPR_SERVER_NAME ServerName,
        [in,unique] const GUID *AuditCategory,
        [in] BOOLEAN RetrieveAllSubCategories,
        [out] PPOLICY_AUDIT_SUBCATEGORY_ARRAY
            *AuditSubCategoriesArray
    );
```

The audit-related RPC interfaces 225 may include an RPC interface 231 to look-up a name of an audit category, an example of which follows:

```
NTSTATUS
    LsarLookupAuditCategoryName(
        [in,unique,string] PLSAPR_SERVER_NAME ServerName,
        [in] const GUID *AuditCategory,
        [out] PLSAPR_UNICODE_STRING *CategoryName
    );
```

The audit-related RPC interfaces 225 may include an RPC interface 232 to look-up a name of an audit subcategory, which may be an individual audit event. An example follows:

```
NTSTATUS
    LsarLookupAuditSubCategoryName(
        [in,unique,string] PLSAPR_SERVER_NAME ServerName,
        [in] const GUID *AuditSubCategory,
        [out] PLSAPR_UNICODE_STRING *SubCategoryName
    );
```

It will be understood that the audit-related RPC interfaces 225 may include additional or alternative RPC interfaces and that those described here and depicted in FIG. 3 are merely examples of such interfaces. For example, the audit-related RPC interfaces 225 could include an RPC interface 233 for querying effective audit policy for a user. That is, such an interface may show, for a particular user, the effective audit policy, taking into account the policies set per-user and for the system.

Figure 4:
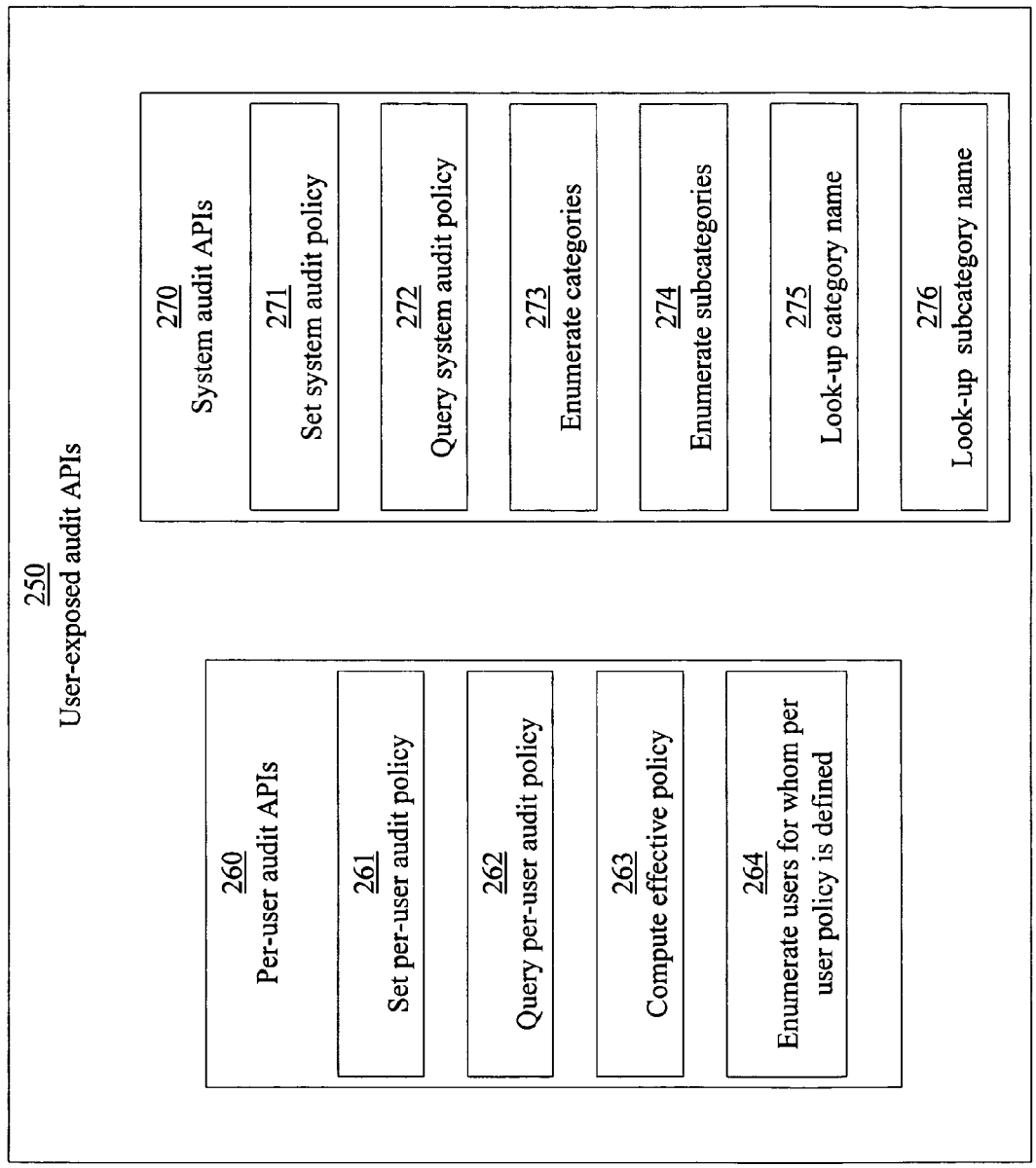
FIG. 4 is a block diagram of user-exposed audit application programming interfaces.

FIG. 4 is a block diagram of user-exposed audit APIs 250. As previously described, such APIs may include per-user audit APIs 260 as well as system audit APIs 270. Per-user audit APIs 260 are audit APIs that enable auditors of a system such as the computer 200, for example, to set an audit policy desired for a specific user without having the audit policy set for the system. Such APIs enable different users of the same computer, such as the computer 200, to have different audit policies of the auditor's choosing, regardless of the audit policies applied to other users.

One of the per-user audit APIs 260 may be a set per-user audit policy 261, which sets audit policy for one or more categories, subcategories or individual audit events for the specified security principal. The caller or user of such API, referred to in this document as an "auditor", may be required to have heightened access privileges to set audit policy. The following is an example of a set per-user audit policy 261:

```
BOOLEAN AuditSetPerUserPolicy(
    _in PCSID pSid,
    _in_ecount(PolicyCount) PCAUDIT_POLICY_INFORMATION
    pAuditPolicy,
    _in ULONG PolicyCount
);
```

Parameters for this API include:

pSid: [in] Pointer to a SID (security identity) of the principal to which this functions sets audit policy.

pAuditPolicy: [in] Pointer to an array of AUDIT_POLICY_INFORMATION structure. The AuditCategoryGuid member of this structure may be ignored. Per-user Audit policy may be set for all subcategories or individual audit events specified via this parameter.

PolicyCount: [in] Denotes the number of elements in the pAuditPolicy array.

Return values for this API may include TRUE on success and FALSE on failure. Additionally, a GetLastError( ) function may be used to obtain a more specific status code. The following status codes may be returned:

ERROR_NO_SUCH_USER: No user exists with the specific SID.

ERROR_INVALID_PARAMETER: The parameters are incorrectly formed. No audit policy is set if any one of the elements in the pAuditPolicyInformation structure is invalid.

ERROR_ACCESS_DENIED: Privilege or access necessary to perform this operation does not exist.

Another per-user audit API 260 may be a query per-user audit policy 262, which queries audit policy for one or more categories, subcategories or individual audit events for the specified security principal. The caller or user of such API may be required to have heightened access privileges to set audit policy. The following is an example of a query per-user audit policy 262:

```
BOOLEAN AuditQueryPerUserPolicy(
    _in PCSID pSid,
    _in_ecount(PolicyCount) PCGUID pSubCategoryGuids,
    _in ULONG PolicyCount,
    _deref_out_ecount(PolicyCount)
    PAUDIT_POLICY_INFORMATION*
        ppAuditPolicy
    );
```

The parameters for the query per-user audit policy 262 may include:

pSid: [in] Pointer to a SID (security identity) of the principal to which this function queries audit policy.

pSubCategoriesGuids: [in] Pointer to an array of SubCategory Guids for which per-user audit policy has to be retrieved. The total number of GUIDS pointed to is PolicyCount.

PolicyCount: [in] A ULONG that consists of the count of GULID elements pointed to by pSubCategoriesGuids. This is also the number of AUDIT_POLICY_INFORMATION elements returned from ppAuditPolicy.

ppAuditPolicy: [out] Pointer to a single allocated block buffer to return an array of AUDIT_POLICY_INFORMATION structure. The total number of elements is PolicyCount. Per-user audit policy is retrieved for all subcategories specified via pSubCategoryGuids. The category associated with each subcategory is also retrieved and passed out via AuditCategoryGuid. Pointers within the buffer are pointers to locations within a single allocated block. The single returned buffer may be freed by calling AuditFree.

The return values for this API may include TRUE on success and FALSE on failure. The GetLastError( ) function can be used to get a more specific status code. The following status codes can be returned.

ERROR_ACCESS_DENIED: Privilege or access necessary to perform this operation does not exist.

ERROR_INVALID_PARAMETER: The parameters are incorrectly formed.

ERROR_FILE_NOT_FOUND: No per-user policy exists for the user specified by pSid.

Another per-user audit API 260 may be a compute effective policy 263, which computes effective audit policy for one or more categories, subcategories, or individual audit events for a security principal by combining system audit policy with per-user policy. The caller or user of such API may be required to have heightened access privileges. The following is an example of a compute effective audit policy 263:

```
BOOLEAN AuditComputeEffectivePolicyBySid(
    _in PCSID pSid,
    _in_ecount(PolicyCount) PCGUID pSubCategoryGuids,
    _in ULONG PolicyCount,
    _deref_out_ecount(PolicyCount)
    PAUDIT_POLICY_INFORMATION*
        ppAuditPolicy
    );
```

The parameters for this API may include:

pSid: [in] Pointer to a SID of the principal to which this function queries effective audit policy.

pSubCategoriesGuids: [in] Pointer to an array of SubCategory Guids for which effective audit policy has to be retrieved. The total number of GUIDS pointed to is PolicyCount.

PolicyCount: [in] A ULONG that consists of the count of GUID elements pointed to by pSubCategoriesGuids. This is also the number of AUDIT_POLICY_INFORMATION elements returned from ppAuditPolicy.

ppAuditPolicy: [out] Pointer to a single allocated block buffer to return an array of AUDIT_POLICY_INFORMA-TION structure. The total number of elements is PolicyCount. Effective audit policy is retrieved for all subcategories, or individual audit events, specified via pSubCategoryGuids. The category associated with each subcategory is also retrieved and passed out via AuditCategoryGuid. Pointers within the buffer are pointers to locations within a single allocated block. The single returned buffer may be freed by calling AuditFree.

The return values for this API may include TRUE on success and FALSE on failure. The GetLastError( ) function can be used to get a more specific status code. The following status codes can be returned:

ERROR_ACCESS_DENIED: Privilege or accesses necessary to perform this operation does not exist.

ERROR_INVALID_PARAMETER: The parameters are incorrectly formed.

ERROR_FILE_NOT_FOUND: No per-user policy exists for the user specified by pSid

Another per-user audit API 260 may be an API for enumerating users for whom per-user auditing has been specified 264. The caller or user of such API may be required to have heightened access privileges. The following is an example:

```
BOOLEAN AuditEnumeratePerUserPolicy(
    _out PPOLICY_AUDIT_SID_ARRAY* ppAuditSidArray
    );
```

The parameters for the API 264 may include:

ppAuditSidArray: [out] Pointer to a single allocated block buffer to return the array of sids. Pointers within the buffer are pointers to locations within a single allocated block. The single returned buffer must be freed by calling AuditFree. The UsersCount member of this structure contains the number of sids pointed to by UserSidArray.

```
typedef struct _POLICY_AUDIT_SID_ARRAY {
    ULONG UsersCount;
```

-continued

```
#ifdef MIDL__PASS
        [size_is(UsersCount)] PAUDIT_SID_RPC*
        UserSidArray;
#else
    PSID* UserSidArray;
endif
} POLICY_AUDIT_SID_ARRAY,
*PPOLICY_AUDIT_SID_ARRAY;
```

Return values for this API include TRUE on success and FALSE on failure. The GetLastError( ) function can be used to get a more specific status code. The following status codes can be returned.

ERROR_INVALID_PARAMETER: The parameters are incorrectly formed.

ERROR_ACCESS_DENIED: Privilege or accesses necessary to perform this operation does not exist.

The user-exposed audit APIs 250 include system audit APIs 270, or APIs that enable performing audit functions applicable to the system, such as the computer 200. The system audit APIs 270 may include an API to set system audit policy 271. The caller or user of a set system audit policy 271 may be required to have heightened authority to set system audit policy. An example of such an API follows:

```
BOOLEAN AuditSetSystemPolicy(
    _in_ecount(PolicyCount) PCAUDIT_POLICY_INFORMATION
    pAuditPolicy,
    _in ULONG PolicyCount
);
```

The parameters for the set system audit policy API 271 may include:

pAuditPolicy: [in] Pointer to an array of AUDIT_POLICY_INFORMATION structure. System audit policy may be set for all subcategories specified via this parameter.

PolicyCount: [in] Denotes the number of elements in the pAuditPolicy array.

The return values for this API may include TRUE on success and FALSE on failure. The GetLastError( ) function can be used to get a more specific status code. The following status codes can be returned.

ERROR_INVALID_PARAMETER: The parameters are incorrectly formed. No audit policy is set if any one of the elements in the pAuditPolicyInformation struct is invalid.

ERROR_ACCESS_DENIED: Privilege or access necessary to perform this operation does not exist.

The system audit APIs 270 may include an API to query system audit policy 272. The caller or user of the API to query system audit policy 272 may be required to have heightened authority to query system audit policy. An example of such an API follows:

```
BOOLEAN AuditQuerySystemPolicy(
    _in_ecount(PolicyCount) PCGUID pSubCategoryGuids,
    _in ULON PolicyCount.
    _deref_out_ecount(PolicyCount)
    PAUDIT_POLICY_INFORMATION*
    ppAuditPolicy
);
```

The parameters for this API include:

pSubCategoriesGuids: [in] Pointer to an array of SubCategory Guids for which system audit policy has to be retrieved. The total number of GUIDS pointed to is PolicyCount.

PolicyCount: [in] A ULONG that consists of the count of GUID elements pointed to by pSubCategoriesGuids. This is also the number of AUDIT_POLICY_INFORMATION elements returned from ppAuditPolicy.

ppAuditPolicy: [out] Pointer to a single allocated block buffer to return an array of AUDIT_POLICY_INFORMATION structure. The total number of elements is PolicyCount. System audit policy is retrieved for all subcategories specified via pSubCategoryGuids. The category associated with each subcategory is also retrieved and passed out via AuditCategoryGuid. Pointers within the buffer are pointers to locations within a single allocated block. The single returned buffer may be freed by calling AuditFree.

The return values for the API may include TRUE on success and FALSE on failure. The GetLastError( ) function can be used to get a more specific status code. The following status codes can be returned.

ERROR_ACCESS_DENIED: Privilege or access necessary to perform this operation does not exist.

ERROR_INVALID_PARAMETER: The parameters are incorrectly formed.

Two of the system audit APIs 270 may be APIs to enumerate categories 273 and to enumerate subcategories 274. An example of an audit API to enumerate categories 273 follows:

```
BOOLEAN AuditEnumerateCategories(
    _deref_out_ecount(*pCountReturned) GUID**
    ppAuditCategoriesArray,
    _out PULONG pCountReturned
);
```

Parameters for this API may include:

ppAuditCategoriesArray: [out] Pointer to a single allocated block buffer to return the array of categories understood by the OS. Pointers within the buffer are pointers to locations within a single allocated block. The single returned buffer must be freed by calling AuditFree.

pCountReturned: [out] Pointer to a variable that contains the number of elements in the ppAuditCategoriesArray array.

Return Values for this API to enumerate categories may be TRUE on success and FALSE on failure. The GetLastError( ) function can be used to get a more specific status code. The following status codes can be returned.

ERROR_INVALID_PARAMETER: The parameters are incorrectly formed.

An example of an API to enumerate subcategories 274 follows:

```
BOOLEAN AuditEnumerateSubCategories(
    _in PCGUID pAuditCategory,
    _in BOOLEAN bRetrieveAllSubCategories,
    _deref_out_ecount(*pCountReturned) PGUID*
    ppAuditSubCategoriesArray,
    _out PULONG pCountReturned
);
```

Parameters for this API may include:

pAuditCategory: [in] Audit category for which a list of all subcategories should be enumerated bRetrieveAllSubCategories: [in] If TRUE, the pAuditCategory parameter is ignored and all subcategories understood by the system is returned via the ppAuditSubCategoriesArray parameter. If this parameter is FALSE, then the pAuditCategory parameter is used to retrieve all the audit subcategories associated with pAuditCategory.

ppAuditSubCategoriesArray: [out] Pointer to a single allocated block buffer to return the array of subcategories understood by the OS. Pointers within the buffer are pointers to locations within a single allocated block. The single returned buffer may be freed by calling AuditFree.

pCountReturned: [out] Pointer to a variable that contains the number of elements in the ppAuditSubCategoriesArray array.

Return values for the API to enumerate subcategories 274 may include TRUE on success and FALSE on failure. The GetLastError( ) function can be used to get a more specific status code. The following status codes can be returned.

ERROR_INVALID_PARAMETER: The parameters are incorrectly formed.

Two of the system audit APIs 270 may be APIs to look-up a category name 275 and to look-up a subcategory name 276. An example of an API to look-up a category name 275 follows:

```
BOOLEAN AuditLookupCategoryName(
    _in      PCGUID pAuditCategory,
    _deref_out PTSTR* ppszCategoryName
);
```

Parameters for the API to look-up category name 275 include:

pAuditCategory: [in] The auditing category for which the display name should be retrieved.

ppszCategoryName: [out] Receives the name of the category. This should be freed by calling AuditFree.

The return values for this API may include TRUE on success and FALSE on failure. GetLastError( ) function can be used to get a more specific status code. The following status codes can be returned.

ERROR_INVALID_PARAMETER: The parameters are incorrectly formed.

An example of the API to look-up a subcategory name 276 follows:

```
BOOLEAN AuditLookupSubCategoryName(
    _in      PCGUID pAuditCategory,
    _deref_out PTSTR* ppszSubCategoryName
);
```

Parameters for this API include:

pAuditCategory: [in] Pointer to a GUID that identifies the Subcategory.

ppszSubCategoryName: [out] Receives the name of the Subcategory. This may be freed by calling AuditFree.

The return values for the API to look-up a subcategory name 276 includes TRUE on success and FALSE on failure. The GetLastError( ) function can be used to get a more specific status code. The following status codes can be returned.

ERROR_INVALID_PARAMETER: The parameters are incorrectly formed.

Figure 5:
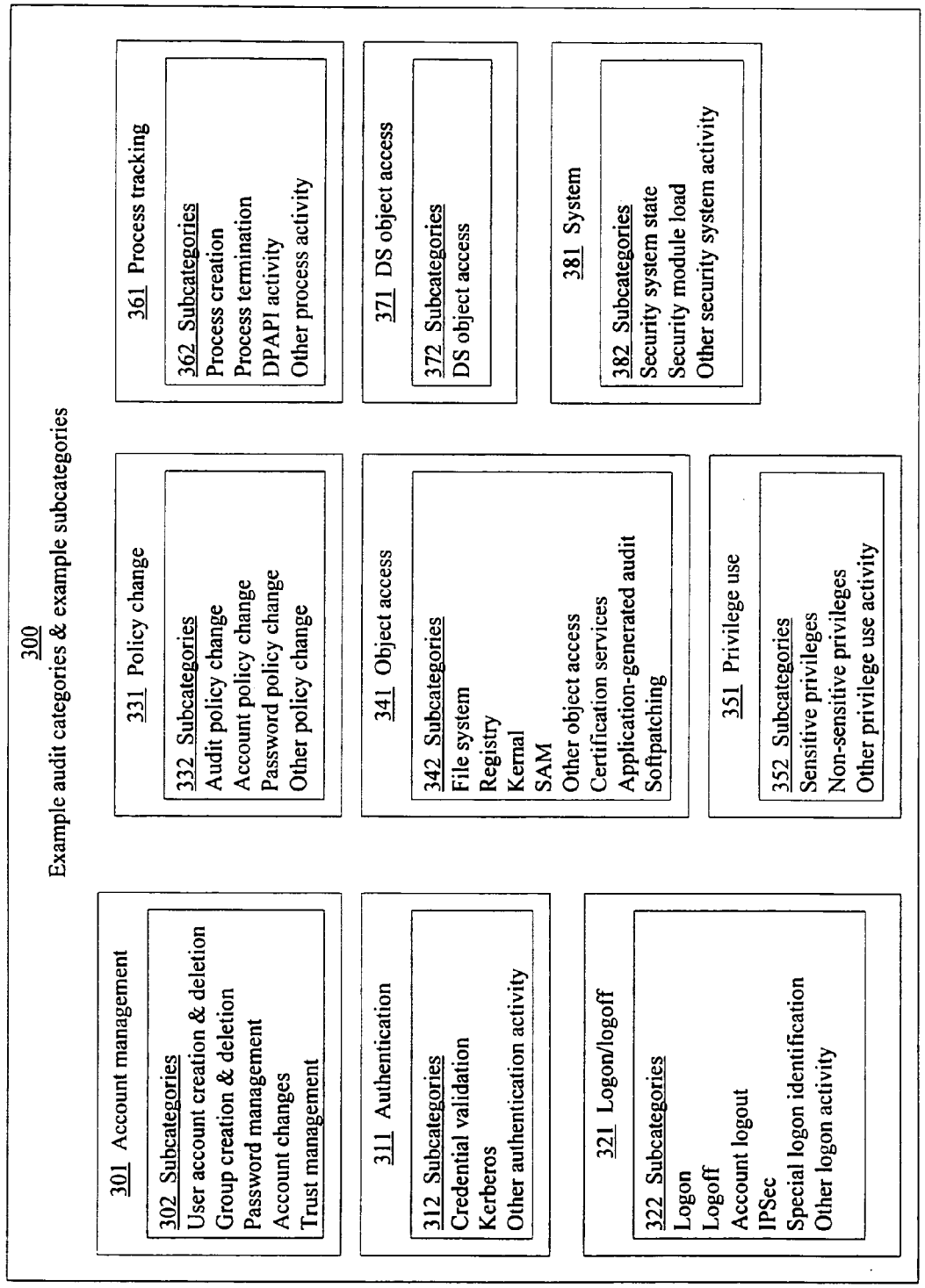
FIG. 5 is a block diagram of example audit categories and example audit subcategories.

FIG. 5 is a block diagram of example audit categories and example audit subcategories 300 that may be contained within the audit policy store 215 of the local security authority 210. The example audit categories and example audit subcategories 300 are the types of audit categories and subcategories that may be accessed on a per-user and system basis, at a granular level, using the foregoing user-exposed and private APIs. The subcategories provided for example in FIG. 5 may be individual audit events, though it should be recognized that, in alternative embodiments, the subcategories may also be groupings of individual audit events.

An audit category for account management 301 may include audit subcategories 302. Some subcategories 302 may be a user account creation and deletion subcategory, a group creation and deletion subcategory, a password management subcategory, an account changes subcategory and a trust management subcategory.

An audit category for authentication 311 may include audit subcategories 312. Some subcategories 312 may be a credential validation subcategory, a Kerberos subcategory, and other authentication activity subcategory.

An audit category for logon/logoff 321 may include audit subcategories 322. Some subcategories 322 may include a logon subcategory, a logoff subcategory, an account logout, an IPSec subcategory, a special logon identification subcategory, and other logon activity subcategory.

An audit category for policy change 331 may include audit subcategories 332. Some subcategories 332 may include an audit policy change subcategory, account policy change subcategory, password policy change subcategory, and other policy change subcategory.

An audit category for object access 341 may include audit subcategories 342. Such subcategories 342 may include a file system subcategory, a registry subcategory, a kernel subcategory, a SAM subcategory, other object access subcategory, certification services subcategory, application-generated audit subcategory, and a softpatching subcategory.

An audit category for privilege use 351 may include audit subcategories 352. Such subcategories 352 may include a sensitive privileges subcategory, a non-sensitive privileges subcategory, and other privilege use activity subcategory.

An audit category for process tracking 361 may include audit subcategories 362. Such subcategories 362 may include a process creation subcategory, process termination subcategory, DPAPI activity subcategory, and other process activity subcategory.

An audit category for DS object access 371 may include an audit subcategory 371 for DS object access.

An audit category for system 381 may include audit subcategories 382. Such subcategories 382 may include a security system state subcategory, a security module load subcategory, and other security system activity subcategory.

Figure 6:
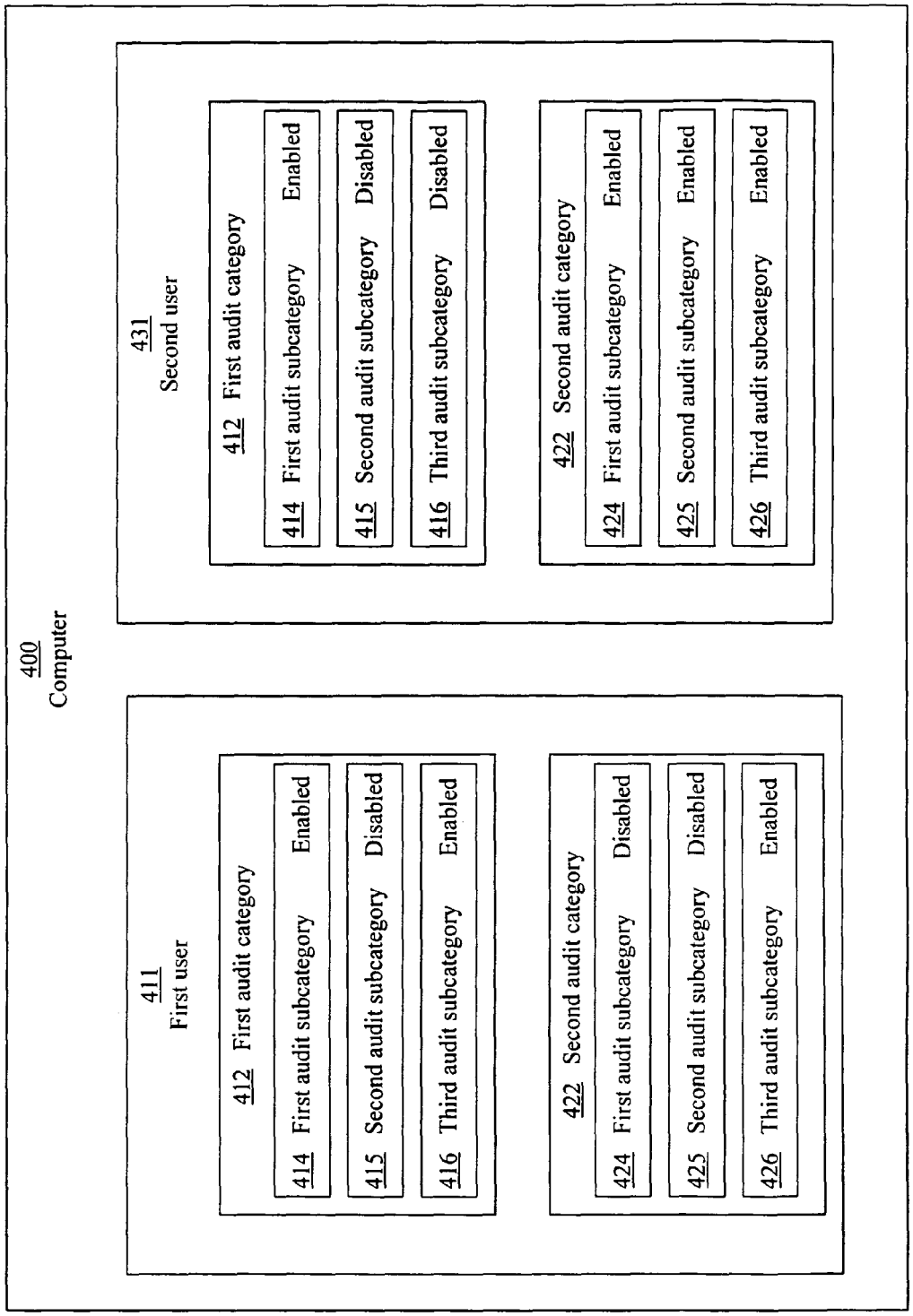
FIG. 6 is a block diagram of a computer implementing per-user audit policies.

FIG. 6 is a block diagram of computer 400, which may be a computer 110 or a computing environment 100 described in FIG. 1. The computer 400 may include a local security authority and user-exposed audit APIs as described with regard to FIGS. 2-5. The computer 400 may be accessible by a first user 411 and by a second user 431. A first user 411 and a second user 431 may have access to the computer 400. For example, the first user 411 may log onto the computer 400 in a manner different from the manner in which the second user 431 logs onto the computer 400. In this way, the computer 400, and thus an auditor of the computer 400, may discern which of the first and second users 411, 431 is using it.

In addition to providing granular auditing by allowing execution of individual subcategory audits within an audit category, as described herein, the computer 400 or the local security authority may enable each user, such as the first user 411 and the second user 431, to implement per-user auditing. That is, audit categories or subcategories may be enabled or disabled for the first user 411 may enable and disable regardless the audit categories and subcategories enabled or disabled for the second user 431. The per user audit policy may be relative to system audit policy. An example system audit policy may be a subcategory that may be set so that it may be enabled or disabled. The per user audit policy for the same subcategory may be established per-user such that it is enabled or disabled. If the system has disabled the audit, then the user may set an inclusion to enable the audit. If the system has enabled the audit, then the user may be precluded from disabling the audit. In alternative embodiments, even if the system has enabled the audit, the audit may be disabled on a per-user basis.

The computer, for example, may include first and second audit categories 412, 422, each of which may be a category described in FIG. 5. Each of the first and second audit categories 412, 422 may include first, second, and third audit subcategories 414-416, 424-426. The subcategories 414-416, 424-426 may be individual audit events such as those described in FIG. 5 or may be groupings of individual audit events within each of the categories 412, 422.

An auditor may enable the first and third audit subcategories 414, 416 of the first audit category 412, and may disable or not enable or select the second audit subcategory 415 associated with the first user 411. If a subcategory is a grouping of individual audit events, then enabling or disabling the subcategory results in, respectively, enabling or disabling all of the individual audit events within the subcategory.

Regardless of those categories 412, 422 or subcategories 414-416, 424-426 enabled for the first user, the auditor may enable the first audit subcategory 414 of the first audit category 412 and not enable the second and third audit subcategories 415, 416 of the first audit category 412 associated with the second user 431. The auditor additionally may enable all of the subcategories 424-426 of the second audit category 422 associated with the second user 431. Thus, the auditor may enable individual audit events or subcategories within audit categories associated with one user without regard to the events enabled for other user.

Figure 7:
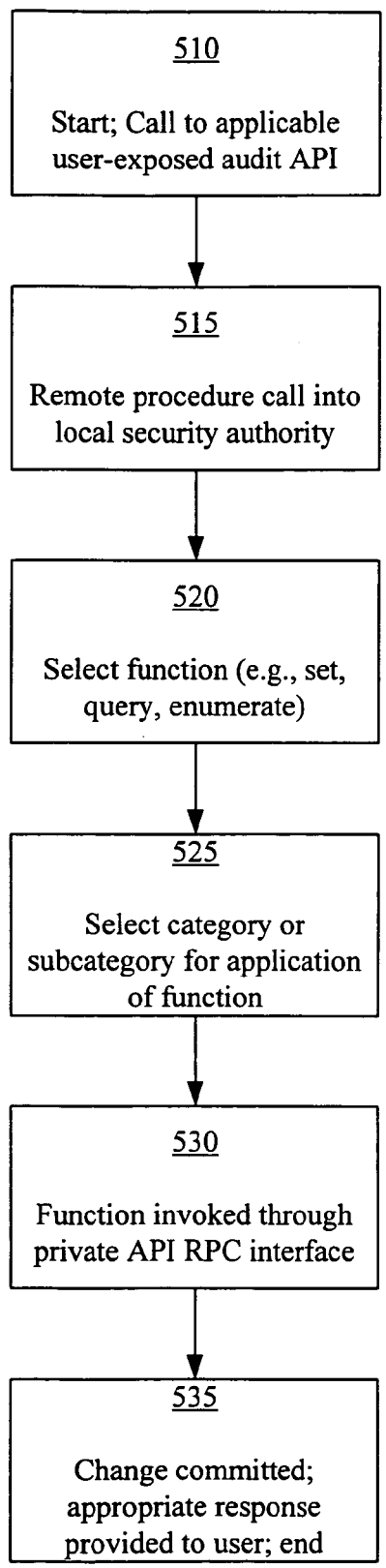
FIG. 7 depicts a flow diagram of an example method for implementing a granular audit policy on a per-user or system basis.

FIG. 7 depicts a flow diagram of an example method 500 for implementing a granular audit policy on a per-user or system basis. The method 500 commences at step 510 with a call to an applicable user-exposed API, such as those APIs described for example purposes in FIG. 4. Such a call may be by an auditor. At step 515, a remote procedure call may be made into the local security authority or other appropriate entity on the computer. Such a call may be performed, for example, by an operating system of the computer and may expose to the user audit functions for selection. For example, the call may enable the user to select a "set audit" or a "query audit" function. Example functions are described in FIG. 3, though the user may be provided with other such functions.

The auditor may select a function at step 520. At step 525, the auditor may be select an audit category or subcategory against which to execute the function. The subcategory may be an individual audit event. Example categories and subcategories are described in FIG. 5, though other categories, subcategories, or individual audit events may be available in alternative embodiments. The function may be invoked through the private API remote procedure call interface at step 530. Example private API remote procedure call interfaces are described in FIG. 3, though other such interfaces may be provided in alternative embodiments. At step 535, the function may be completed and an appropriate response provided to the user.

FIG. 8 is an example of a structure 600 that may be passed into and out of APIs and that may provide audit policy information associated with an audit subcategory or audit category. Each audit category, subcategory, and individual audit event may be uniquely identified by a globally unique identifier (GUID). Thus, for example, each audit subcategory may be referred to as an AuditSubCategoryGuid, as shown in line 605 of the structure 600. Use of a GUID for the subcategories may allow future addition of application specific extensions to audit policies. Auditing information may be specified in a AuditingInformation member, line 610 of the structure 600. When a policy is queried, an AuditCategoryGuid, line 615, may represent the category that AuditSubCategoryGuid 605 belongs to. This may enable an application to associate the audit subcategories, identified with the GUID, with categories.

Using subcategories to specify an audit policy in this way may allow the breaking up a subcategory into two or more subcategories in the future. For example, if an older application sets audit policy for a subcategory that is later divided into two subcategories, all of the subcategories into which the subcategory is broken up may also be changed. Moreover, allowing policy to be established at the subcategory level may allow moving a subcategory into another subcategory in the future.

FIG. 9 depicts an example data structure 700 for providing audit policy established for a user, as identified by a SID, or security identifier. FIG. 10 and FIG. 11, respectively, depict example data structures 800, 900 for providing audit categories and audit subcategories available in the policy store of the available local security authority.

The methods of the present invention may be implemented in hardware, software or, where appropriate, a combination of both. Thus, the methods and apparatus of the present invention, or certain aspects or portions thereof, may take the form of program code (i.e., instructions) embodied in computer readable medium. A processor that executes program code for performing the steps of the methods of embodiments, as described in FIGS. 2-11 and as claimed, constitute a computing environment that embodies the present invention. In the case of program code execution on programmable computers, the computing environment will generally include a processor, a storage medium readable by the processor (including volatile and non-volatile memory and/or storage elements), at least one input device, and at least one output device. One or more programs are preferably implemented in a high level procedural or object oriented programming language to communicate with a computing environment. However, the program(s) can be implemented in assembly or machine language, if desired. In any case, the language may be a compiled or interpreted language, and combined with hardware implementations.

While the present invention has been described in connection with the specific examples in conjunction with the various figures, it is to be understood that other embodiments may be used or modifications and additions may be made to the described embodiments for performing the same function of the present invention without deviating therefrom. The examples are offered in explanation and are in no way intended to limit the scope of the invention as defined in the claims. In summary, in no way is the present invention limited to the examples provided and described herein. Therefore, the present invention should not be limited to any single embodiment, but rather should be construed in breadth and scope in accordance with the appended claims.

What is claimed:

1. A computer-readable storage medium having program code stored thereon that, when executed by a computing environment, causes the computing environment to:

receive a remote procedure call for execution of an audit function selectively associated with a first audit event, the first audit event being selected from a plurality of audit events categorized in a first audit event subcategory of a plurality of audit event subcategories in a first audit event category among a plurality of audit event categories, the remote procedure call being executed by an entity of the computing environment as a result of the first audit event being selected; and execute the audit function by applying it to the first audit event subcategory of the first audit event category, wherein the audit function is selectively applicable to an audit event category and an audit even subcategory therein encompassing one and more than one audit event.

2. The computer-readable storage medium of claim 1, having further program code stored thereon that, when executed by the computing environment, causes the computing environment to:

return a result of executing the audit function to the entity.

3. The computer-readable storage medium of claim 1, wherein the first audit event subcategory is an individual audit event.

4. The computer-readable storage medium of claim 1, wherein the audit function sets audit policy, and wherein executing the audit function results in auditing the first audit event subcategory.

5. The computer-readable storage medium of claim 1, wherein the audit function queries audit policy, and wherein executing the audit function results in obtaining results of an audit of the first audit event subcategory.

6. The computer-readable storage medium of claim 1, wherein executing the audit function results in obtaining a name of the first audit event subcategory.

7. The computer-readable storage medium of claim 1, having further program code stored thereon that, when executed by the computing environment, causes the computing environment to:

receive a second remote procedure call for execution of a second audit function associated with a second audit event, the second audit event being selected from the plurality of audit events categorized in the first audit event subcategory, the second remote procedure call being executed by the entity as a result of the second audit event being selected; and execute the second audit function by applying it to each audit event subcategory of the plurality of audit event subcategories of the first audit event category.

8. The computer-readable storage medium of claim 7, wherein executing the audit function associated with the second audit event results in obtaining a list of the audit event subcategories of the first audit event category.

9. A computer-readable storage medium having program code stored thereon that, when executed by a computing environment, causes the computing environment to:

receive a remote procedure call for execution of an audit function selectively associated with a first audit event, the first audit event being selected from a plurality of audit events; and execute the audit function, wherein the plurality of audit events comprises a per-user audit event associated with only a first user of the computing environment and a system audit event associated with the first user as well as with each other user, if any, of the computing environment, and wherein the remote procedure call is executed as a result of the first audit event being selected.

10. The computer-readable storage medium of claim 9, having further program code stored thereon that, when executed by the computing environment, causes the computing environment to:

return a result of executing the audit function.

11. The computer-readable storage medium of claim 9, wherein executing the audit function causes the audit function to be applied to a first audit event subcategory of an audit event category, the audit event category comprising a plurality of audit event subcategories.

12. The computer-readable storage medium of claim 11, wherein the first audit event subcategory is an individual audit event.

13. The computer-readable storage medium of claim 11, wherein the audit function sets audit policy, and wherein executing the audit function results in auditing the first audit event subcategory on a per-user basis.

14. The computer-readable storage medium of claim 11, wherein the audit function sets audit policy, and wherein executing the audit function results in auditing the first audit event subcategory on a system basis.

15. The computer-readable storage medium of claim 11, wherein the audit function queries audit policy, and wherein executing the audit function results in obtaining results of an audit of the first audit event subcategory on a per-user basis.

16. The computer-readable storage medium of claim 11, wherein the audit function queries audit policy, and wherein executing the audit function results in obtaining results of an audit of the first audit event subcategory on a system basis.

17. The computer-readable storage medium of claim 11, wherein executing the audit function results in obtaining a name of the first audit event subcategory.

18. The computer-readable storage medium of claim 9, wherein executing the audit function results in an enumeration of each user of the computing environment for whom per-user policy has been defined.

19. A processor-implemented method, comprising:

exposing, via the processor, a plurality of selectable audit events to a first user of a computing environment, the plurality of audit events comprising a per-user audit event associated with only the first user and a system audit event associated with the first user and with each other user, if any, of the computing environment;

receiving a selection of a first audit event from the plurality of audit events;

executing a remote procedure call for the execution of an audit function selectively associated with the first audit event; and receiving a result of the execution of the audit function in response to executing the remote procedure call.

20. The method of claim 19, wherein executing the audit function causes the audit function to be applied to a first audit event subcategory of an audit event category, the audit event category comprising a plurality of audit event subcategories.

* * * * *